United States Patent [19]

Starr

[11] Patent Number: 6,151,275
[45] Date of Patent: Nov. 21, 2000

[54] METHOD OF DUAL WAVEFIELD REINFORCEMENT

[75] Inventor: Joel Starr, Richmond, Tex.

[73] Assignee: PGS Tensor, Inc., Houston, Tex.

[21] Appl. No.: 09/151,366

[22] Filed: Sep. 11, 1998

[51] Int. Cl.$^7$ ............................................ G01V 1/40
[52] U.S. Cl. ............................ 367/57; 367/28; 181/112
[58] Field of Search ................................ 367/24, 48, 52, 367/59, 21, 57, 28, 27, 30, 43; 702/14; 181/112

[56] References Cited

U.S. PATENT DOCUMENTS

| | | |
|---|---|---|
| 3,689,874 | 9/1972 | Foster et al. . |
| 4,253,164 | 2/1981 | Hall, Jr. . |
| 4,658,387 | 4/1987 | Dolengowski et al. . |
| 4,794,573 | 12/1988 | Bell et al. .................................. 367/57 |
| 4,803,666 | 2/1989 | Alford . |
| 4,817,061 | 3/1989 | Alford et al. . |
| 4,888,743 | 12/1989 | Thomsen . |
| 4,903,244 | 2/1990 | Alford . |
| 4,910,716 | 3/1990 | Kirlin et al. . |
| 4,912,979 | 4/1990 | Sondergeld et al. . |
| 4,933,913 | 6/1990 | Thomsen . |
| 4,935,903 | 6/1990 | Sanders et al. . |
| 4,937,793 | 6/1990 | Shuck et al. ............................. 367/24 |
| 4,992,993 | 2/1991 | Chambers . |
| 5,027,332 | 6/1991 | Alford . |
| 5,029,146 | 7/1991 | Alford . |
| 5,136,544 | 8/1992 | Thomsen et al. . |
| 5,163,028 | 11/1992 | Barr et al. . |
| 5,235,554 | 8/1993 | Barr et al. . |
| 5,257,241 | 10/1993 | Henderson et al. . |
| 5,365,492 | 11/1994 | Dragoset, Jr. . |

OTHER PUBLICATIONS

Christine E. Krohn, "Geophone ground coupling," Geophysics, Jun. 1984, vol. 49, No. 6, P. 722–731.

Mundy Brink, "Application of Vertical Receiver Arrays in 3–D Seismic Exploration," GECO A.S., 1988, vol. 1, P. 460–463.

Harold Washburn, et al, "The Effect of the Placement of a Seismometer on its Response Characteristics," The Society of Exploration Geophysics, Apr., 1941, vol. VI, No. 2, P. 116–131.

W.A. Schneider, et al., "Ocean–Bottom Seismic Measurements off the California Coast," The American Geophysical Union, Mar., 1964, vol. 69, No. 6, P. 1135–1143.

Bernard Widrow, et al., "Adaptive Noise Canceling: Principles and Applications," The Institute of Electrical and Electronic Engineers, vol. 63, No. 12, P. 1692–1716.

(List continued on next page.)

*Primary Examiner*—Anthony Jolly
*Attorney, Agent, or Firm*—Arnold & Associates

[57] ABSTRACT

A method and system of dual wavefield reinforcement or increasing the contributions to each image point in the seismic image can be accomplished by aligning the upward traveling energy, U, and the downward traveling energy, D, and then summing U and D in the stacking process. A method of dual wavefield reinforcement includes receiving seismic data having both up going and down going wavefields. The up going wavefields are separated from the down going wavefields. Pre-NMO and post NMO statics for each of said up going and said down going wavefields are calculated. The determined pre-NMO static is applied to each of the up going and the down going wavefields. NMO/DMO stacking velocities for the seismic data on an up going wavefield floating datum is determined. Using a difference between the up going wavefield floating datum and the down going wavefield floating datum and the NMO/DMO stacking velocities for the seismic data on an up going wavefield floating datum the NMO/DMO stacking velocities for the seismic data on a down going wavefield floating datum can be determined. The NMO/DMO stacking velocities for the seismic data on the up going wavefield floating datum and the down going wavefield floating datum is applied. The determined post NMO statics are applied to bring each of the up going and the down going wavefields to the final datum. The up going and the down going wavefields are summed to provide dual wavefield reinforcement.

23 Claims, 11 Drawing Sheets

OTHER PUBLICATIONS

G.M. Hoover, et al., "*The influence of the planted geophone on seismic land data,*" Geophysics, Aug., 1980, vol. 45, No. 8, P. 1239–1253.

T.H. Tan, "*Reciprocity theorem applied to the geophone–ground coupling problem,*" Geophysics, Dec., 1987, vol. 52, No. 12, P. 1715–1717.

David W. Bell, et al, "*Two–Trace Directional Filter for Processing Offset Vertical Seismic Profiles,*" AAPG Bulletin, Mar., 1988, vol. 72, No. 3, p. 375.

Paul C. Wuenschel, "*Removal of the detector–ground coupling effect in the vertical seismic profiling environment,*" Geophysics, Mar., 1988, vol. 53, No. 3, P. 359–364.

D. Loewenthal, et al, "*Deterministic Estimation of a Wavelet Using Impedance Type Technique,*" Geophysical Prospecting, Nov., 1985, vol. 33, No. 7, P. 956–969.

Milo M. Backus, "*Water Reverberation—Their Nature and Elimination,*" Geophysics, Apr., 1959, vol. 14, No. 2, P. 233–261.

J.E. White, "*Plane Waves,*" McGraw–Hill Book Company, 1965, P. 15–77.

David J. Monk, "*Wavefield separation of twin streamer data,*" Halliburton Geophysical Service, Mar., 1990, vol. 8, No. 3, P. 96–104.

Mundy Brink, et al, "*Marine Seismic Exploration Using Vertical Receiver Arrays: Acquisition in Bad Weather,*" Jun., 1987, P. 4–5.

United Kingdom Patent 1316479, "*Improvement of Seismic Data Records by Frequency Domain Operation*", inventor William Howard Ruehle, published May 9, 1973.

Vaughn Ball and Dennis Corrigan, "*Dual–sensor summation of noisy ocean–bottom data,*" $66^{th}$ Annual Internat. Mtg., Soc. Expl. Geophys., Expanded Abstracts, 1996, P. 28–31.

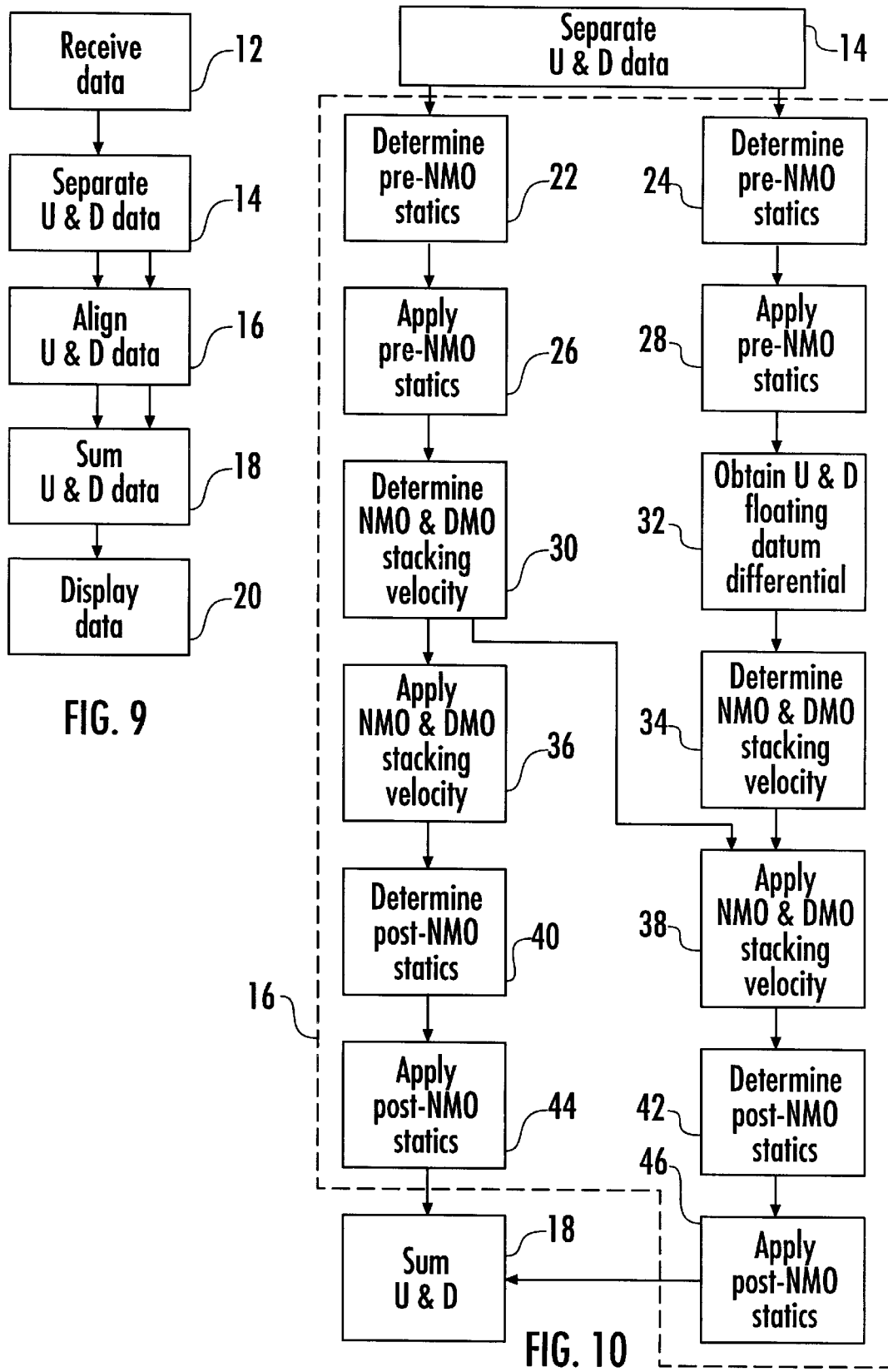

METHOD OF DUAL WAVEFIELD REINFORCEMENT

BACKGROUND OF THE INVENTION

1. Field of the Invention

The present invention pertains to a method for reinforcing a wavefield in a dual wavefield environment and more particularly to reinforcing a wavefield in a dual wavefield environment with an offset.

2. Related Prior Art

Pressure and velocity detectors are used to separate upward traveling waves (U), from downward traveling waves (D), in a seismic experiment. For the case of pressure and particle velocity detectors located on the water bottom, a method is described in U.S. Pat. No. 4,935,903, Sanders et al., where the downward traveling waves can be used to reinforce the upward travelling waves. In this method, D is time shifted by the vertical two-way travel time of the water column to align (in time), with U. The two wavefields are added together to produce pre-stack reinforced data.

The method described in U.S. Pat. No. 4,935,903, titled "Reinforcement of Surface Seismic Wavefields" relates to a marine seismic reflection prospecting system that attenuates coherent noise through reinforcement of primary reflection data by the addition of corrected ghost reflection data. The system described includes a seismic energy source, a detector, a wavefield separator, a time shift element, and an element for generating an output signal representative of an additive linear combination of time aligned primary and ghost signal components. The system's output is suitable for further pre-stack processing, e.g., NMO correction.

SUMMARY OF THE INVENTION

The foregoing method of reinforcing surface wavefields is only valid for the zero offset case. This is the case where the source and receivers occupy the same space. Because of offset, the distance between the source and receiver, the two wavefields do not align when a simple time shift is applied. The method of the present invention includes the removal of the offset term through Normal Moveout (NMO), and through Dip Moveout (DMO). The use of Normal Moveout and Dip Moveout approximate the zero offset case. The two wavefields can now be time shifted into alignment and added together to produce a reinforced stacked image.

The present invention provides a method of dual wavefield reinforcement or a method of increasing the contributions to each image point in the seismic image by aligning the upward traveling energy, U, and the downward traveling energy, D, and then summing U and D in the stacking process. The method of the present invention of dual wavefield reinforcement includes receiving seismic data having both up going and down going wavefields. The up going wavefields are separated from the down going wavefields. Pre-NMO and post NMO statics for each of said up going and said down going wavefields are calculated. The determined pre-NMO static is applied to each of the up going and the down going wavefields. NMO/DMO stacking velocities for the seismic data on an up going wavefield floating datum is determined. Using a difference between the up going wavefield floating datum and the down going wavefield floating datum and the NMO/DMO stacking velocities for the seismic data on an up going wavefield floating datum the NMO/DMO stacking velocities for the seismic data on a down going wavefield floating datum can be determined. The NMO/DMO stacking velocities for the seismic data on the up going wavefield floating datum and the down going wavefield floating datum is applied. The determined post MMO statics are applied to bring each of the up going and the down going wavefields to the final datum. The up going and the down going wavefields are summed to provide dual wavefield reinforcement.

BRIEF DESCRIPTION OF THE DRAWINGS

FIG. 9 is a simplified flow chart of the method of the present invention.

FIG. 10 is a flow chart illustrating greater detail for aligning block 16 of FIG. 9.

DESCRIPTION OF THE PREFERRED EMBODIMENT

Pressure and particle velocity detectors on the water bottom may be used to separate upward traveling wavefields from polarity reversed downward traveling wavefields as demonstrated in U.S. Pat. No. 5,754,492 issued to Starr.

Figure 1:
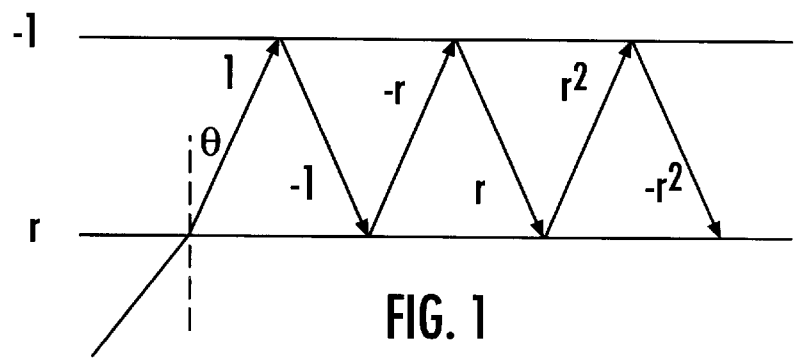
FIG. 1 is a drawing illustrating trapped reflection energy from the subsurface trapped in a water column between the water surface and the water bottom.

FIG. 1 illustrates a plane wave and its reverberations trapped in the water column. Reflection energy travels up through the subsurface and is recorded by the detectors lying on the water bottom. The reflection energy then becomes trapped in the water column where it is reflected back and forth between the water's surface and the water bottom. In the illustration, the water's surface has a reflection coefficient of −1 and the water bottom has a reflection coefficient of r.

The pressure and velocity responses to the water reverberations, in the form of a z-transform, are:

$$P(Z) = Z^0 - (1+r)Z^1 + r(1+r)Z^2 - r^2(1+r)Z^3 + \cdots$$

$$\frac{\alpha}{\cos\Theta}V(Z) = Z^0 - (1+r)Z^1 + r(1+r)Z^2 - r^2(1+r)Z^3 + \cdots$$

where:
P=pressure
V=partial velocity
$Z=e^{1\omega}$
$\alpha$=impedance
$\Theta$=angle of incidence
r=reflection coefficient of the water bottom $\tau$ = two-way travel time through the water column $$= \frac{2d}{v\cos\theta}$$

where
d=vertical water depth
v=acoustic velocity

Calculating the infinite geometric progression of the reverberation operator yields:

$$P(Z) = 1 + \frac{(1-r)Z}{1+rZ} \tag{3}$$

$$= \frac{1-Z}{1+rZ}$$

$$\frac{\alpha}{\cos\theta}V(Z) = 1 - \frac{(1-r)Z}{1+rZ} \tag{4}$$

$$= \frac{1+Z}{1+rZ}$$

Adding equations (3) and (4) yields the up going wave field U(Z) and subtracting (3) from (4) yields the polarity reversed down going wavefield D(Z).

$$U(Z) = \frac{1}{2}\left[\frac{\alpha}{\cos\theta}V(Z) + P(Z)\right]$$

$$= \frac{1}{2}\left[\frac{1+Z}{1+rZ} + \frac{1-Z}{1+rZ}\right]$$

$$= \frac{1}{1+rZ}$$

$$D(Z) = \frac{1}{2}\left[\frac{\alpha}{\cos\theta}V(Z) - P(Z)\right]$$

$$= \frac{1}{2}\left[\frac{1+Z}{1+rZ} - \frac{1-Z}{1+rZ}\right]$$

$$= \frac{Z}{1+rZ}$$

For the one dimensional case, the difference between U(Z) and D(Z) is the two way travel time through the water column Z.

Figure 2:
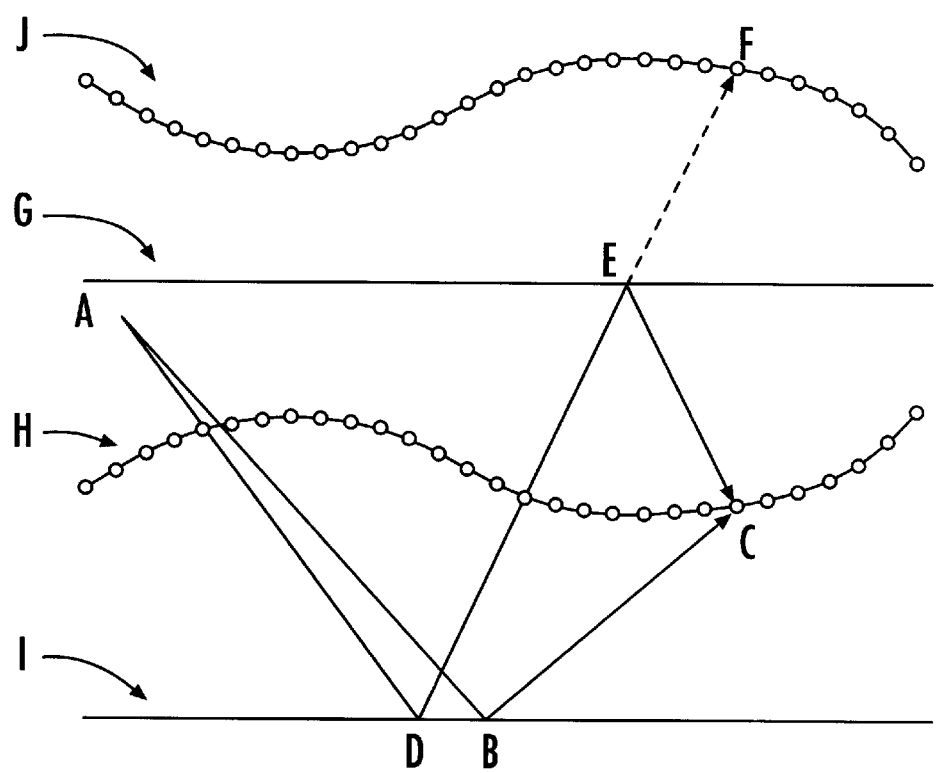
FIG. 2 is a sketch illustrating the time difference between up going and down going wavefields caused by offset.

Referring now to FIG. 2, an illustration of how the offset effects the time difference between U and D is presented. A seismic source is fired in the water column at point A. The seismic wave follows ray path AB where it reflects off a subsurface layer I, then follows path BC to the water bottom H where a receiver located at point C records it. The seismic energy following ray path ABC is the upward travelling wave U, described previously. Another portion of the wave front follows ray path ADE where it reflects off the water/air interface G, then travels along ray path EC to the receiver located at C. The seismic energy following ray path ADEC is the downward travelling wave recorded at point C The polarity reversed downward travelling wave D, as described previously, has an apparent ray path ADF. This ray path is equivalent to a ray path recorded at image point F on ghost water bottom J.

The travel time difference between ray paths ADF and ABC is the additional time required by ADF to travel through the water layer. This time difference changes with offset. As a result, to align events recorded from a multiplicity of receivers on surface H with those on surface J, there must be a correction made for offset dependency. This can be accomplished by applying the appropriate corrections to simulate zero offset (NMO and DMO) to the energy recorded along H and J prior to correcting for the vertical travel time between each receiver on H and its corresponding ghost receiver on J.

In addition, datum statics must also be considered. Since the source and receivers do not have the same elevation, pre-NMO and post NMO datum statics must be calculated and applied. This will approximate an experiment where the source and receiver are on the same surface or datum. Datum statics compensates for the vertical one way travel time of the shot and receiver to the datum surface. In this case, the datum surface is the surface of the water.

Figure 3:
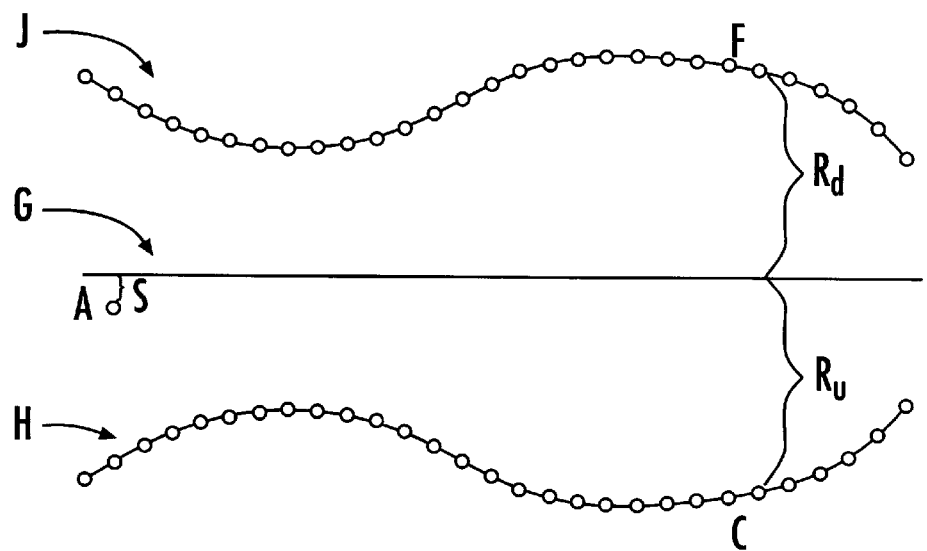
FIG. 3 is a sketch illustrating the determination of datum statics.

FIG. 3 provides a plan view of how the datum statics are determined. The one way travel time of the shot A(S) is the vertical distance from A to surface G divided by the water velocity (usually 1500 meters per second). The one way travel time of receiver C(Ru) is the vertical distance between point C and surface G divided by the water velocity. This is the same one way travel time for receiver point F(Rd), since F and C are the same distance from surface G.

The total static $T_u$ required to shift the upward traveling data recorded at point C to datum G is:

$$T_u = S + R_u$$

Where
$T_u$ is the total static,
S is the shot static, and
$R_u$ is the receiver static for U.

The total static, $T_d$, required to shift the downward travelling data recorded at point F to datum G is:

$$T_d = S - R_d$$

where
$T_d$ is the total static,
S is the shot static, and
$R_d$ is the receiver static for D.

The post NMO static is the average total static for all traces that share the same mid-point location. For a given mid-point location the CDP MEAN static is:

$$CDP\ MEAN_u = \frac{\sum_n T_u}{n}$$

$$CDP\ MEAN_d = \frac{\sum_n T_d}{n}$$

For U and D respectively, n is the number of traces contributing to the mid-point location.

The CDP MEAN static is the static required to bring the trace from the "floating datum" to the final datum. The floating datum is the datum where all traces contributing to a mid-point location have the shot and receiver on the same datum but require minimal static adjustment from the recorded datums. The static adjustment to bring a trace from the recorded datum to the floating datum is the pre-NMO static or RESIDUAL STATIC. By applying the pre_NMO static prior to NMO and the post_nmo static after NMO the NMO equation is being honored. This equation assumes the shot and receiver to be on the same flat datum. The hyperbolic nature of the data is not distorted which would be the case had we applied the final datum adjustments prior to NMO.

The pre-NMO static is calculated using the following formulas:

RESIDUAL STATIC$_u$=$T_u$-CDP MEAN$_u$

RESIDUAL STATIC$_d$=$T_d$-CDP MEAN$_d$

Figure 4:
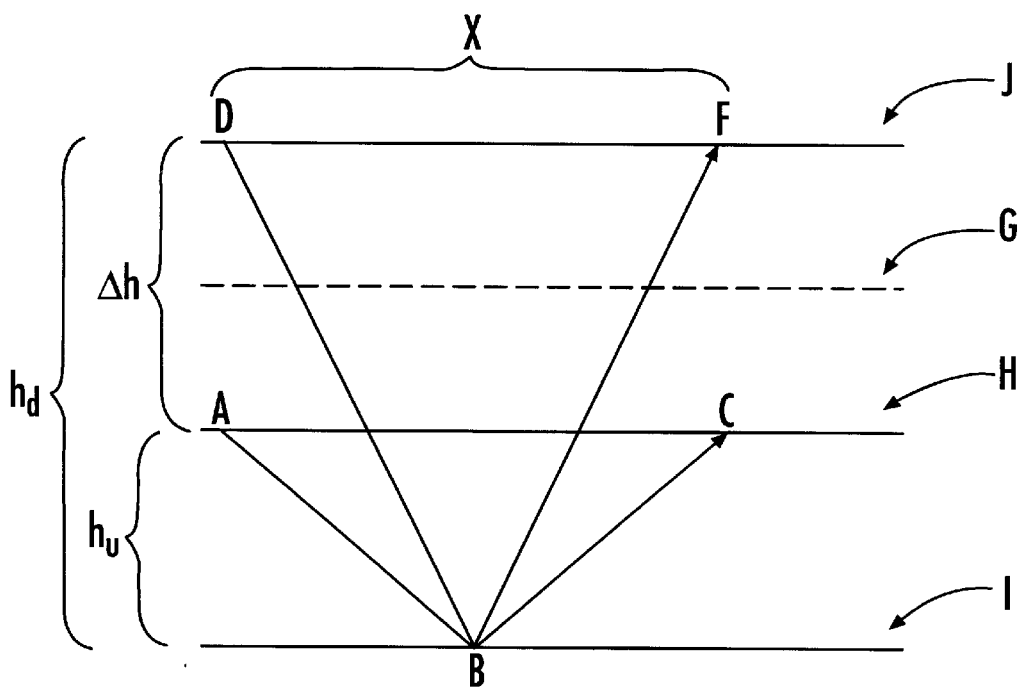
FIG. 4 is a sketch illustrating the determination of travel time equations for offset dependent data.

By applying the pre_NMO statics for the upward and downward traveling energy in FIG. 2, the data types have been brought to their respective floating datums as illustrated in FIG. 4.

In FIG. 4, the basis for the travel time equations for offset dependent data are illustrated. These equations are defined in Exploration Seismology, volume 1, page 80 (Sheriff et al., 1981). These equations can be redefined to describe the upward travelling energy along path ABC and the downward travelling energy along path DBF ($t_u$ and $t_d$ respectively).

$$t_u = \frac{x^2}{v^2} + t_{Du}^2$$

$$t_d = \frac{x^2}{v^2} + t_{Od}^2$$

where:

$$t_{Ou} = \frac{2h_u}{v}$$

$$t_{Dd} = \frac{2h_d}{v}$$

$h$ = depth to reflector $x$ = horizontal offset $v$ = velocity

These equations illustrate the travel times of the two ray paths to be a non-linear function of offset, depth to reflector and velocity. Hence, travel time corrections must be applied through the NMO/DMO equations before a linear time shift (post-NMO static) can be applied to align the recorded data. The velocity used to apply the travel time is based on the time shift, $\Delta t$, required to correct the offset dependent time to $t_o$ time, (stacking velocities). Since $t_{ou}$ and $t_{od}$ are not the same, unique stacking velocities are required for the upward traveling energy versus downward traveling energy.

Figure 5:
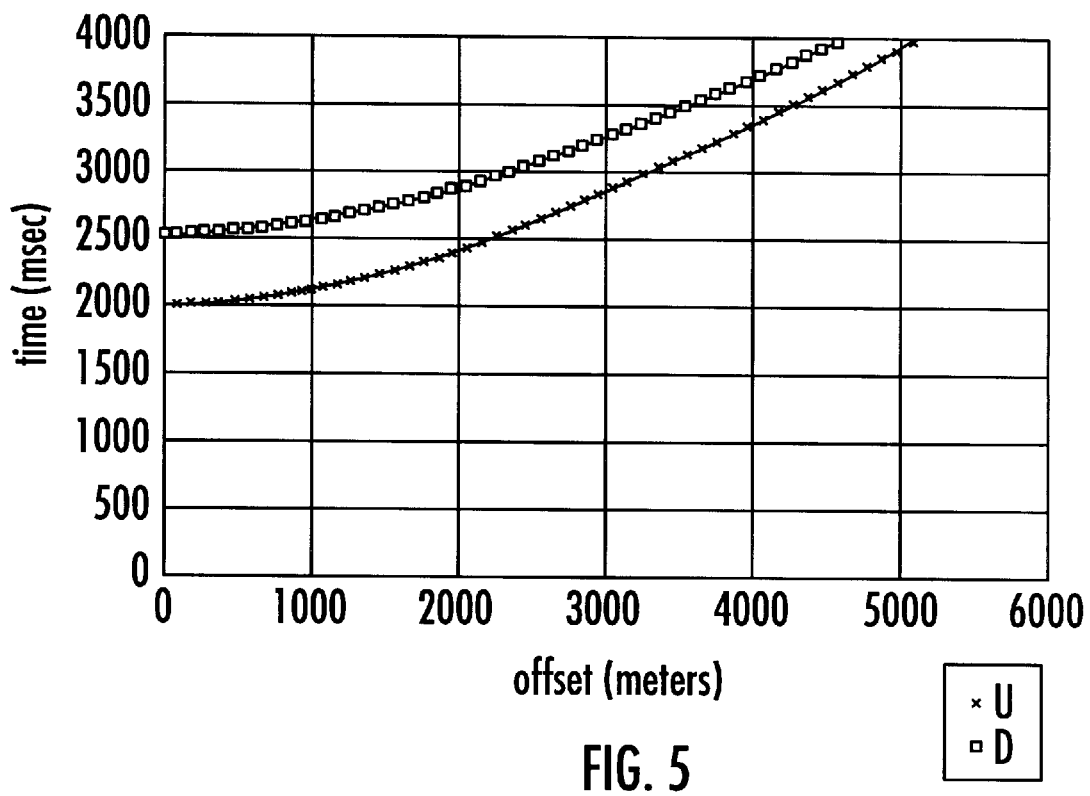
FIG. 5 is a graphical representation of a travel time hyperbola.
Figure 6:
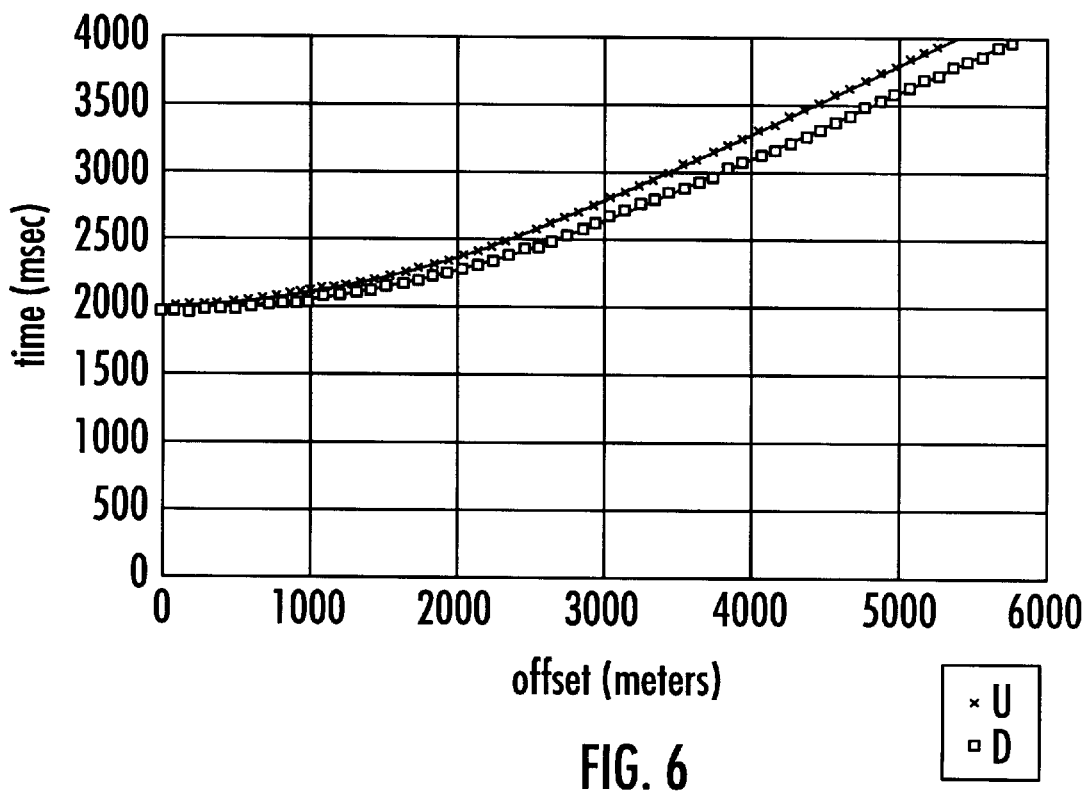
FIG. 6 is a graphical representation of a travel time hyperbola with a linear time shift applied.
Figure 7:
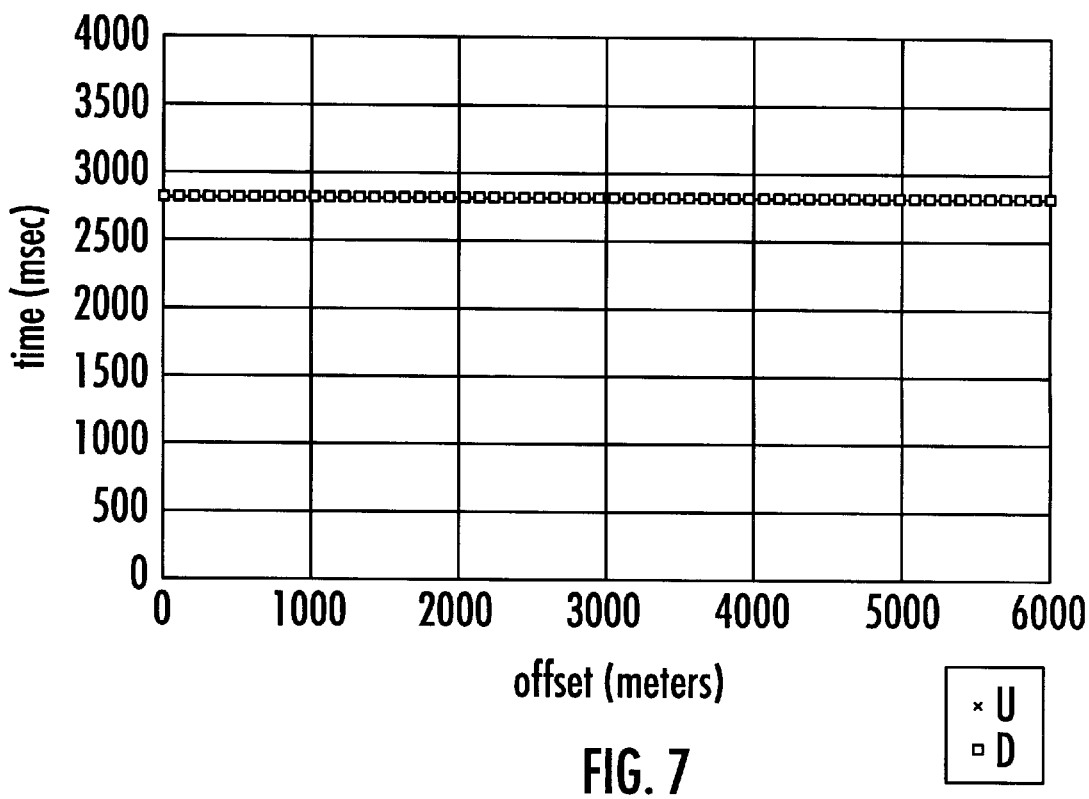
FIG. 7 is a graphical representation of a travel time hyperbola with a travel time correction applied.
Figure 8:
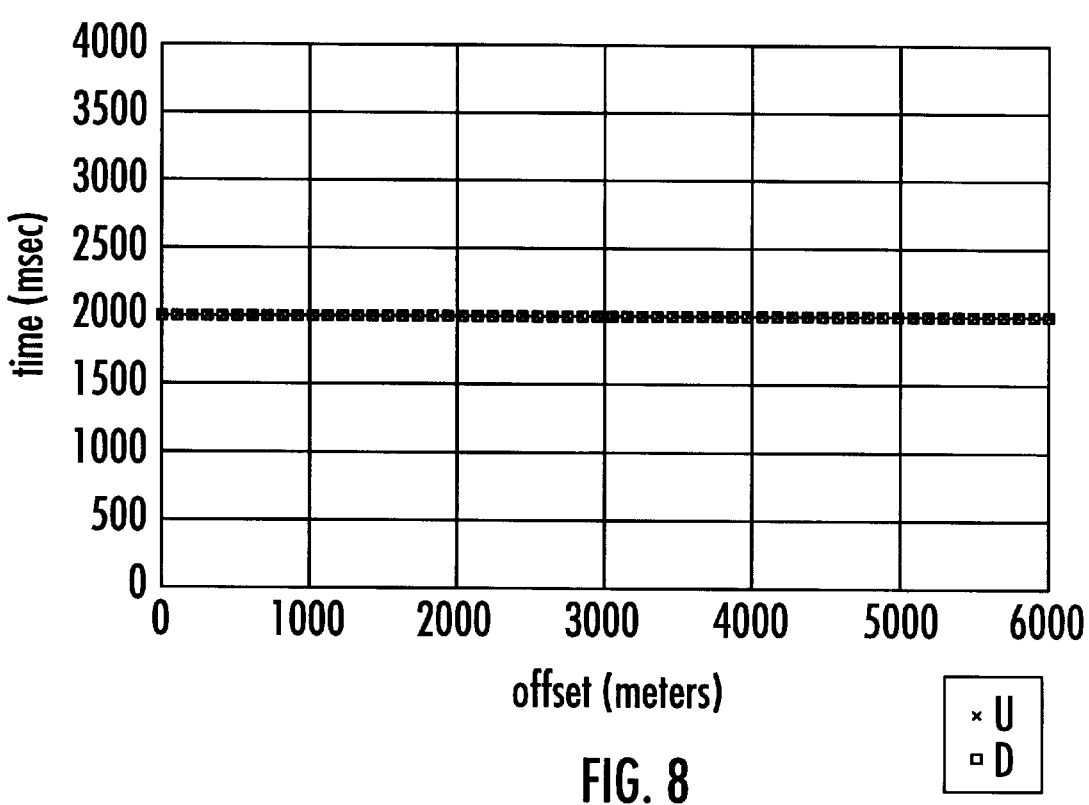
FIG. 8 is a graphical representation of a travel time hyperbola with a travel time correction applied and with a linear time shift applied.

Referring now to FIG. 5, the travel time hyperbolas for the upward traveling energy, U, and the downward traveling energy, D, are illustrated. In this Figure the y-intercept is $t_o$. In FIG. 6 a linear time shift required to align $t_{od}$ and $t_{ou}$ is applied to the travel time hyperbolas of FIG. 5. The linear time shift required to align $t_{od}$ and $t_{ou}$ does not align the data anywhere else along the hyperbolas except at the y-intercept. In FIG. 7 the offset dependent data is corrected to $t_o$. When this is done, the data now can be aligned with a linear time shift which comprehends the difference between $t_{ou}$ and $t_{od}$ as illustrated in FIG. 8.

FIG. 9 is a simplified flow chart of the method of the present invention. In block 12, seismic data is received. This data contains both upgoing and downgoing energy or wavefields. At block 14, the data is separated into upgoing, U, and downgoing, D, wavefields. This process may be done by any method known in the art, such as using the detected wavefields from pressure and velocity detectors to separate upward traveling waves (U), from downward traveling waves (D) by software after the data is acquired. At block 16 the separated data is further processed to align the upgoing traveling waves (U) and the downgoing traveling waves (D). Once the upgoing and downgoing waves are aligned, the two sets of data are summed at block 18. The reinforced wavefields summed at block 18 may be displayed at block 20 by any conventional means known in the art, such as a monitor display, a hard copy seismogram, etc.

FIG. 10 is a flow chart illustrating greater detail for aligning block 16 of FIG. 9. The separated data from block 14 is bifurcated and initially is processed in two parallel paths, one for upgoing wavefields and one for downgoing wavefields. Separated data is fed to blocks 22 and 24, where the pre-UMO static is determined for upgoing wavefields and downgoing wavefields, respectively. At blocks 26 and 28 the pre-NMO static is applied for the upgoing wavefields and downgoing wavefields, respectively. At this point the parallel processes cease. At block 30, data is received from block 26 and NMO/DMO stacking velocities for upgoing wavefields are determined. At block 32 the upgoing wavefield and downgoing wavefield datum differential is obtained. This differential is combined with the determination of block 30 at block 34 to arrive at the NMO/DMO stacking velocities for downgoing wavefields. At this point the parallel processes for upgoing wavefields and downgoing wavefields resume. At blocks 36 and 38 NMO/DMO stacking velocities for upgoing wavefields and NMO/DMO stacking velocities for downgoing wavefields are applied, respectively. At blocks 40 and 42 post NMO statics for upgoing wavefields and for downgoing wavefields are determined, respectively. At blocks 44 and 46 post NMO statics for upgoing wavefields and for downgoing wavefields are applied, respectively. At block 18, the data from the path including blocks 22, 26, 30, 36, 40 and 44 is summed with the data from the path including blocks 24, 28, 32, 34, 38, 42 and 46. This provides a reinforced stack of data which may be displayed at block 20.

Figure 11:
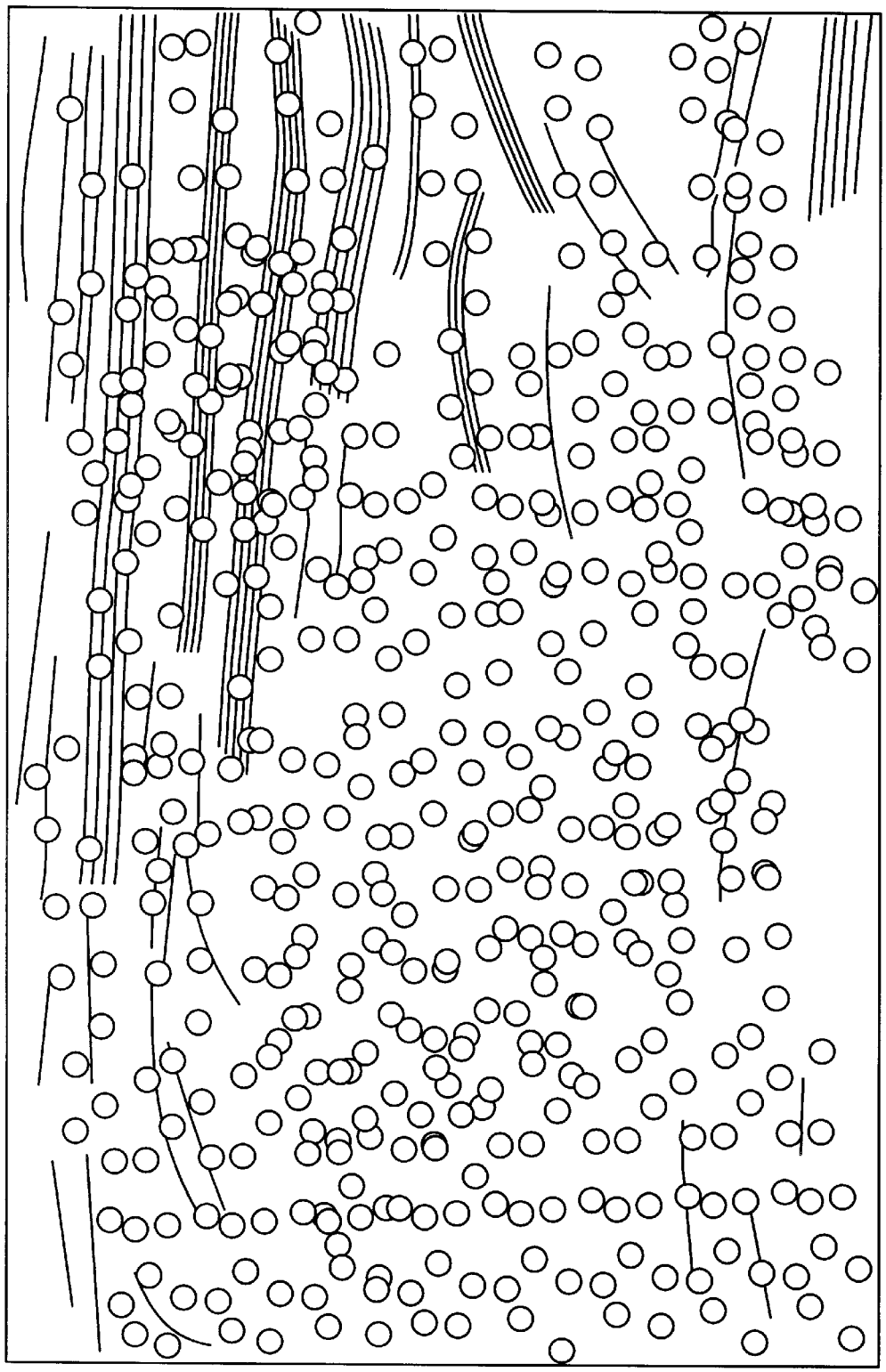
FIG. 11 is an illustration of a seismic section illustrating the up going wave stack.
Figure 12:
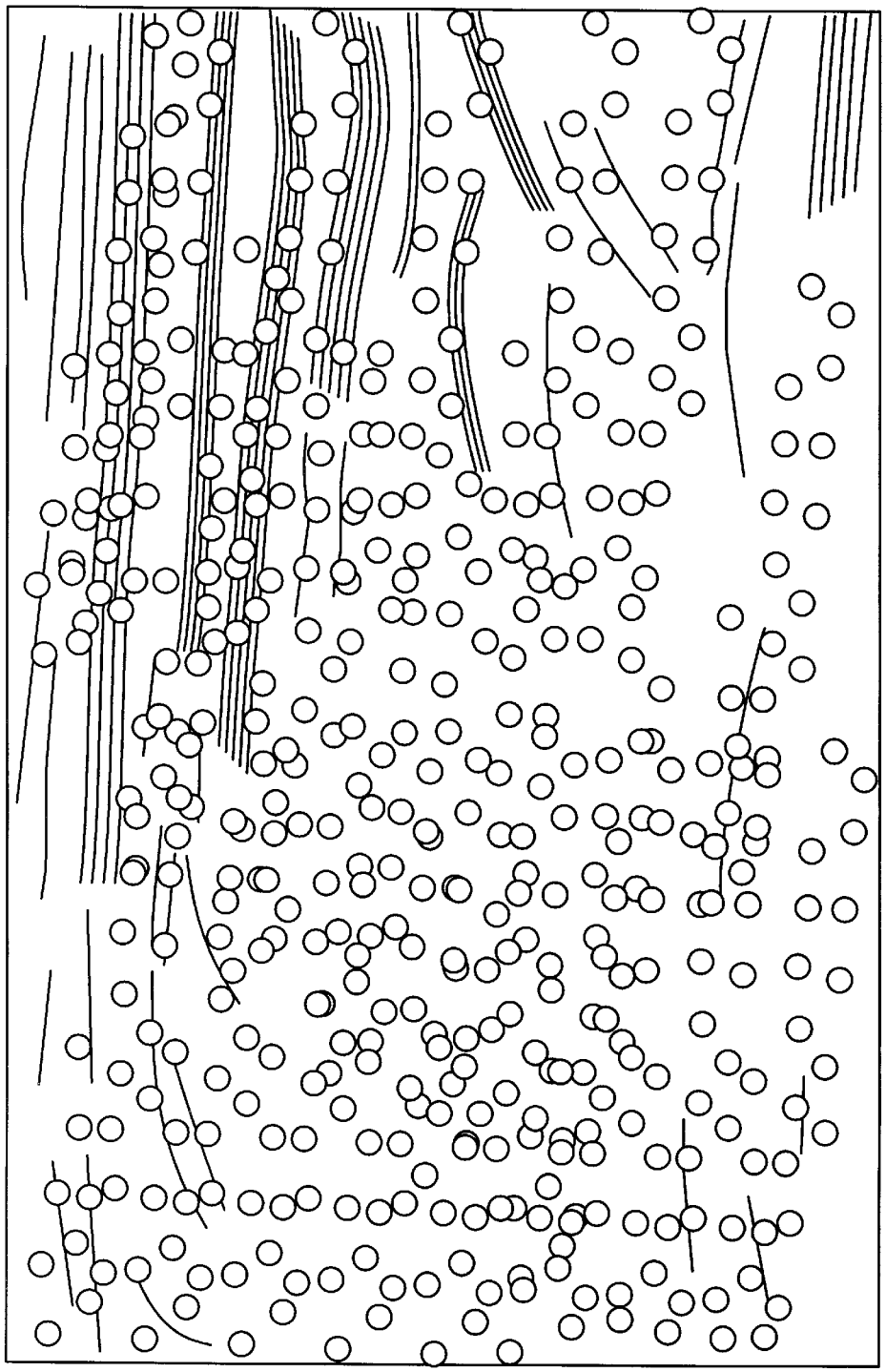
FIG. 12 is an illustration of a seismic section illustrating the down going wave stack.
Figure 13:
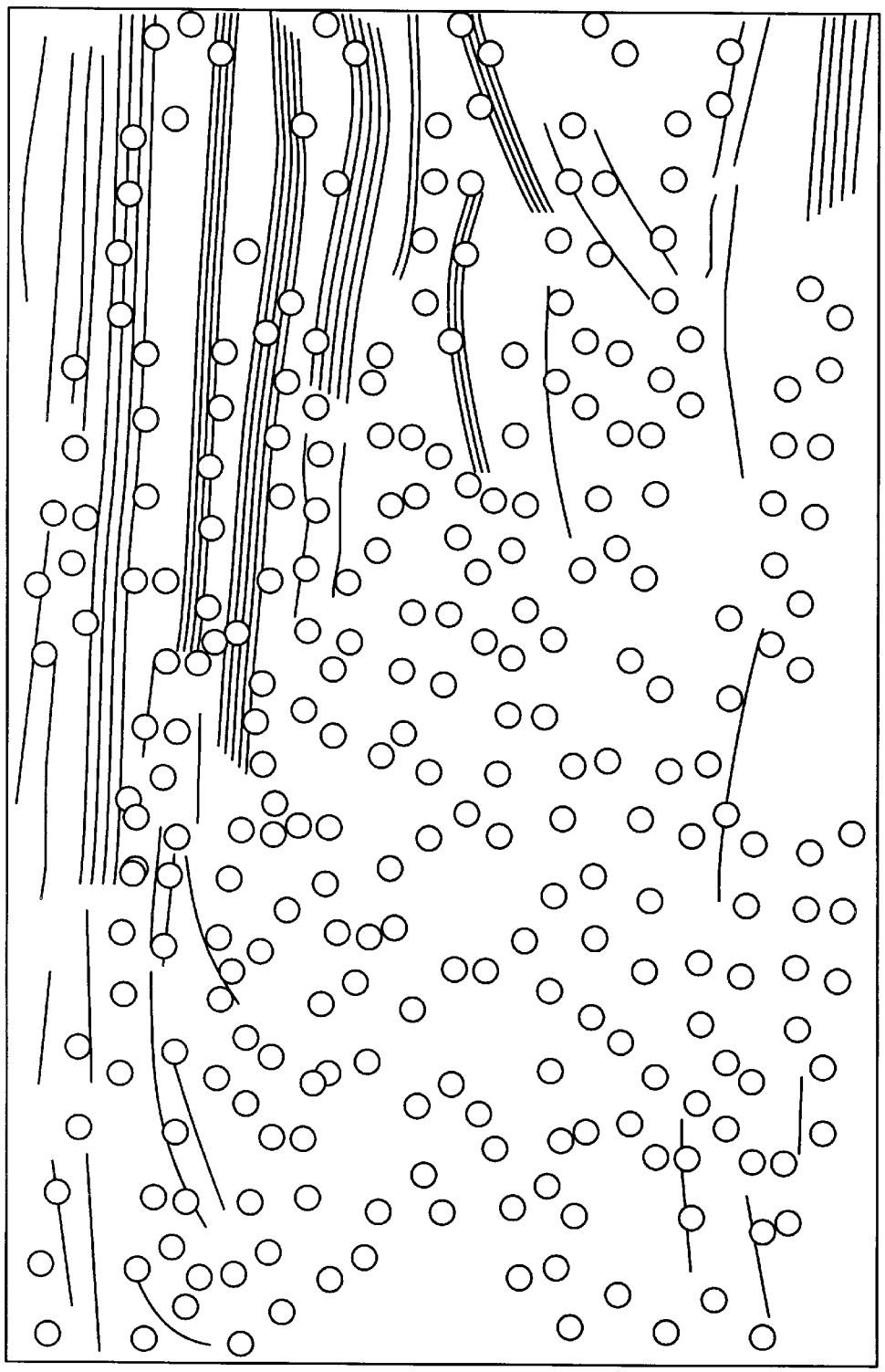
FIG. 13 is an illustration of a seismic section illustrating a reinforced stack summing the up going and down going wave stacks.

FIG. 11 is an illustration of a seismic section illustrating the up going wave stack. FIG. 12 is an illustration of a seismic section illustrating the down going wave stack. FIG. 13 is an illustration of a seismic section illustrating a reinforced stack summing the up going and down going wave stacks. It can easily be seen that the illustrated seismic traces in FIG. 13 are cleaner and more distinct than either FIG. 12 or FIG. 13.

Figure 14:
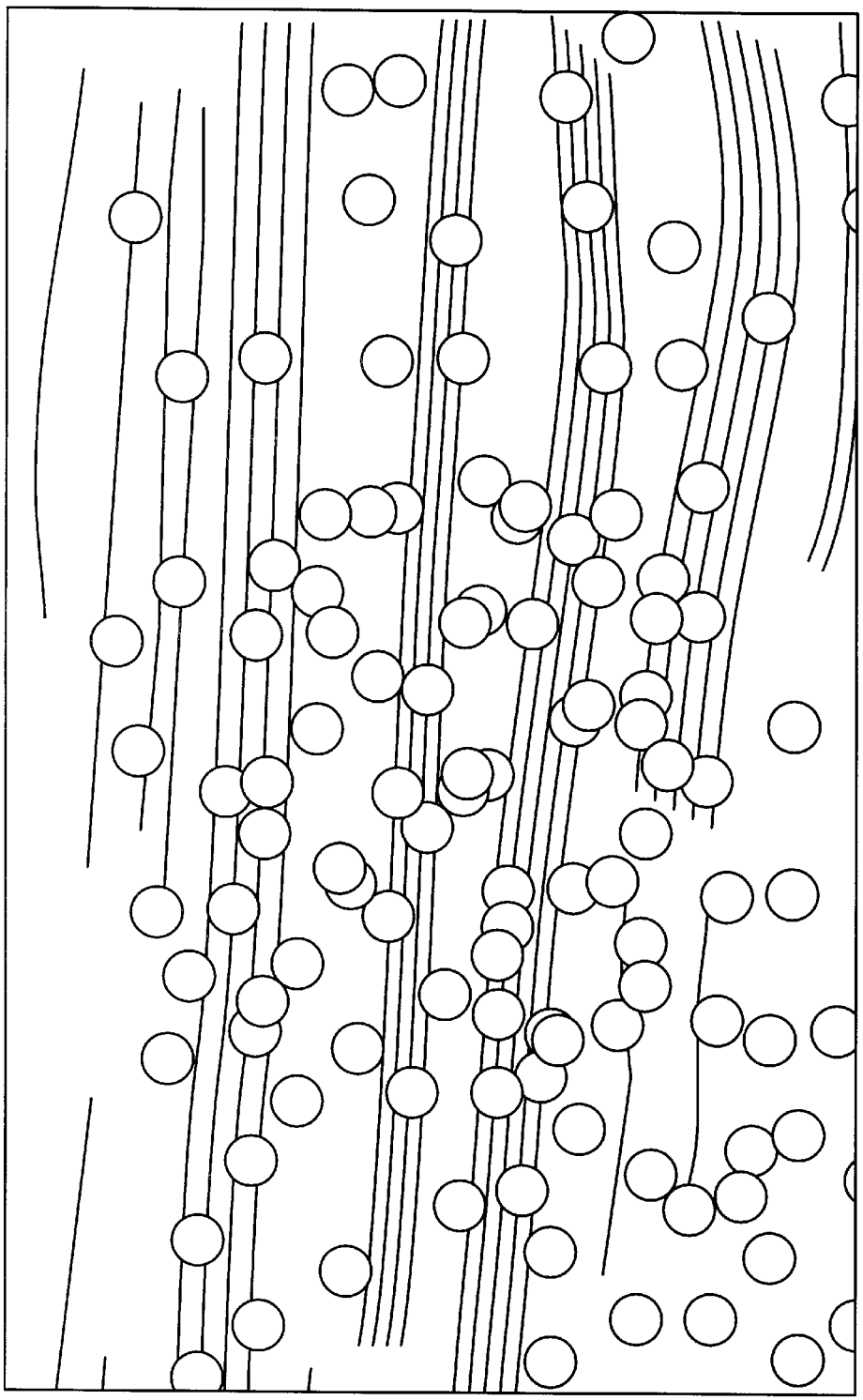
FIG. 14 is an illustration of a seismic section illustrating a portion of the up going wave stack of FIG. 11.
Figure 15:
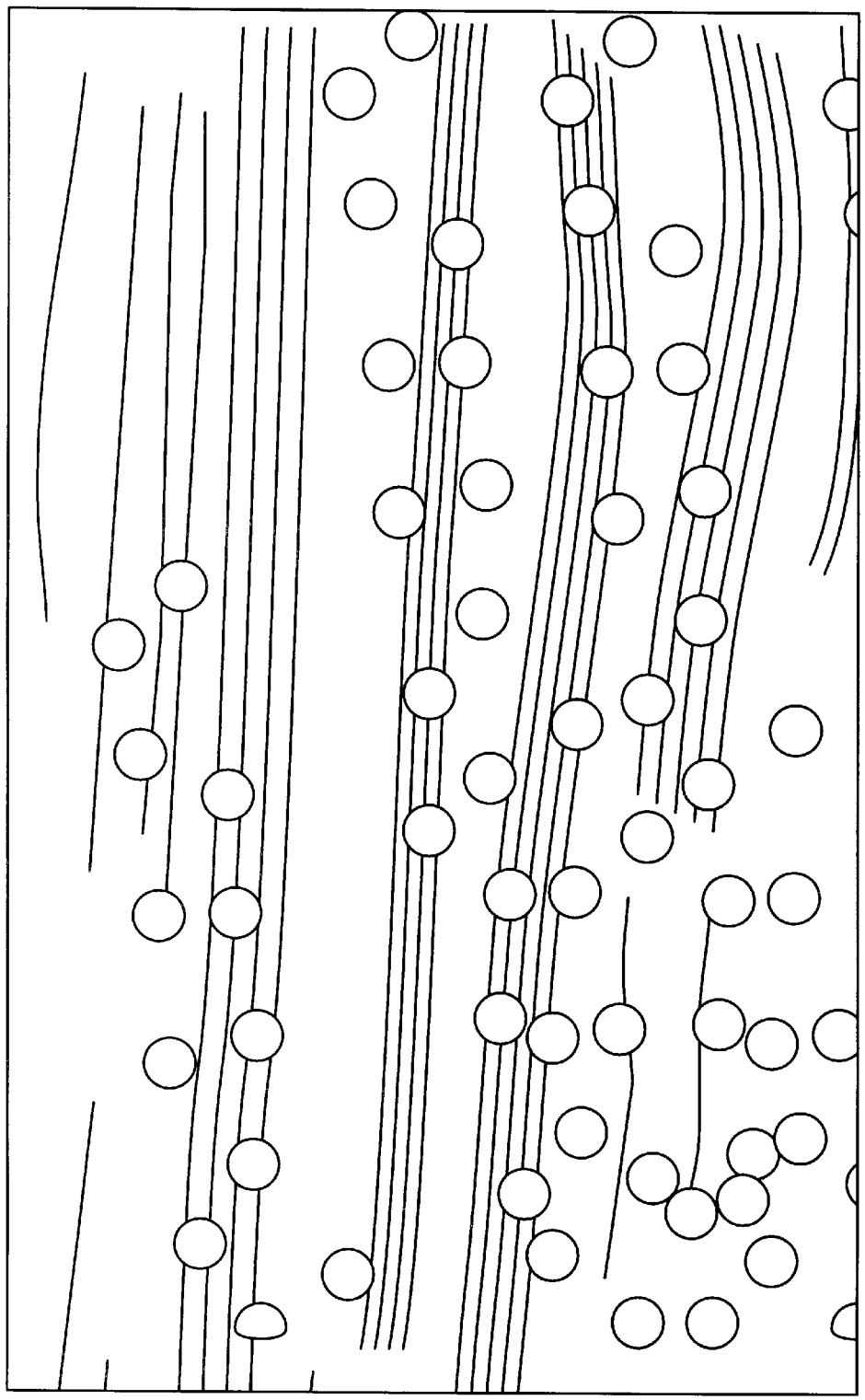
FIG. 15 is an illustration of a seismic section illustrating a portion of the reinforced stack summing the up going and down going wave stacks of FIG. 13.

FIG. 14 is an illustration of a seismic section illustrating a portion of the up going wave stack of FIG. 11. In this figure an illustration of a seismic section are illustrated in greater detail. FIG. 15 is an illustration of a seismic section illustrating a portion of the reinforced stack summing the up going and down going wave stacks of FIG. 13. In comparing FIG. 15 with FIG. 14, the greater clarity and distinctiveness of FIG. 15 over FIG. 14 can easily be seen.

Figure 16:
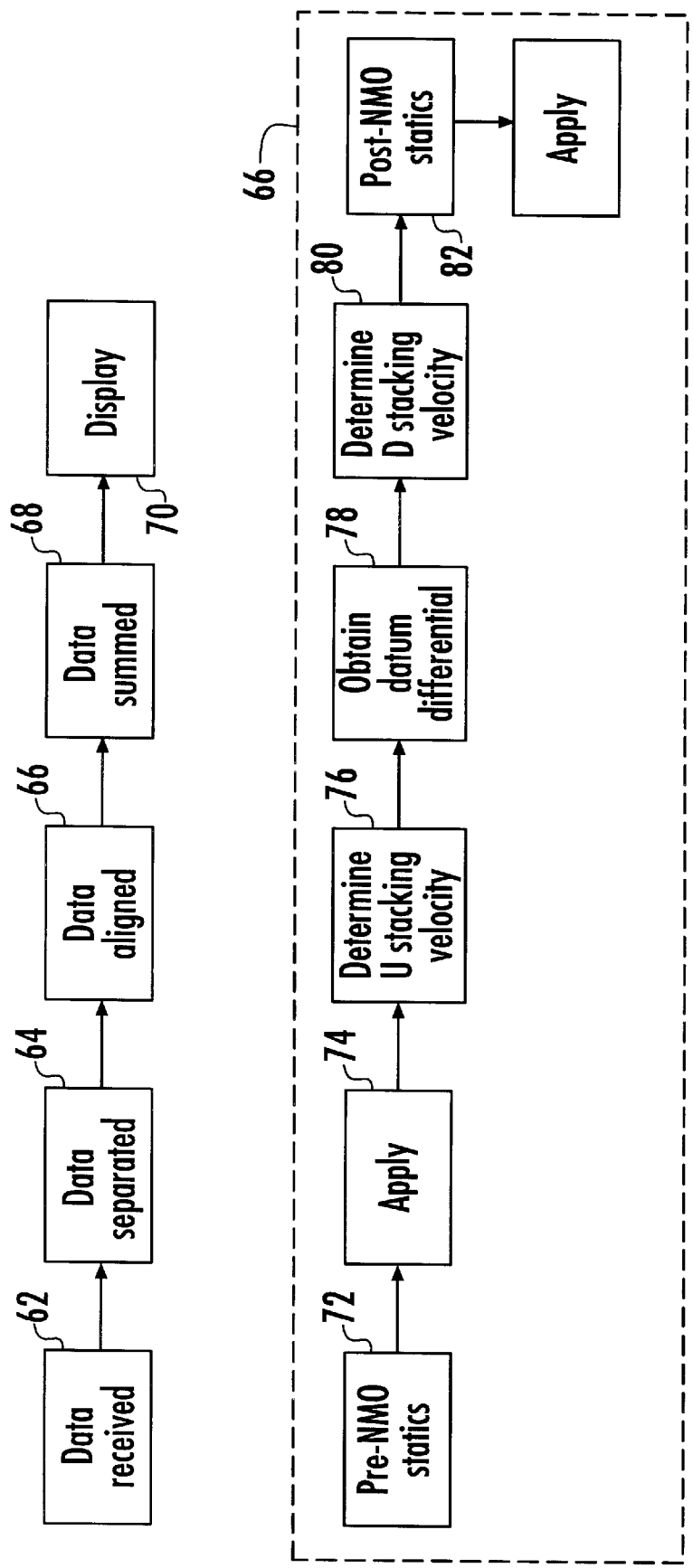
FIG. 16 is a block diagram of a system that may be used to perform the method depicted in the flow charts of FIGS. 9 and 10.

FIG. 16 is a block diagram of a system that may be used to utilize the method of the present invention. In block 62, seismic data is received. This data contains both upgoing and downgoing energy or wavefields. The seismic data may be received by any method commonly used in the art. Block 62 may include seismic pulse detectors that receive the seismic acoustic pulses directly or may receive a tape of the recorded seismic signals, etc.

At block 64, the data is separated into upgoing, U, and downgoing, D, wavefields. This process may be done by any method known in the art, such as using the detected wavefields from pressure and velocity detectors to separate upward traveling waves (U), from downward traveling waves (D) mathematically by software after the data is acquired or by separate tapes from different types of detectors or similar methods.

At an alignment means 66 the separated data is further processed to align the upgoing traveling waves or wavefields, U, and the downgoing traveling waves or wavefields, D. At means for summing 68, the aligned data from upgoing wavefields and downgoing wavefields are summed. Thus, a reinforced stack of data is provided which may be displayed at a display 70. Display 70 may be of any type currently in use in the art, such as a seismogram, cathode ray tube display, liquid crystal display, etc.

Alignment means 66 may be accomplished by an electronically configurable device such as a digital computer. As such, alignment means 66 is to include some or all of the following circuits. Alignment means 66 may include, for example, a means 72 for determining the pre-NMO static for upgoing wavefields and downgoing wavefields. Also included may be a means 74 for applying the pre-NMO statics for upgoing wavefields and downgoing wavefields respectively. A means 76 for determining NMO/DMO stacking velocities for upgoing wavefields is also provided. In alignment means 66 an upgoing wavefield and downgoing wavefield datum differential is obtained at means 78. This differential is combined with the NMO/DMO stacking velocities for upgoing wavefields to arrive at the NMO/DMO stacking velocities for downgoing wavefields at means 80. Alignment means 66 also includes a means 82 for applying NMO/DMO stacking velocities for upgoing wavefields and NMO/DMO stacking velocities for downgoing wavefields. Alignment means 66 may also include means 82 for determining and a means 84 for applying post NMO statics for upgoing wavefields and for downgoing wavefields.

As described previously, the present invention provides a method of dual wavefield reinforcement or a method of increasing the contributions to each image point in the seismic image by aligning the upward traveling energy, U, and the downward traveling energy, D, and then summing u and D in the stacking process. In using the method of the present invention of dual wavefield reinforcement, the up going wavefields are separated from the down going wavefields. In the preferred embodiment, the two sets of data are aligned by first calculating and then applying the pre-NMO and post NMO statics for each of the up going and said down going wavefields. In a further aligning step the NMO/DMO stacking velocities for the seismic data on an up going wavefield floating datum is determined. Using a difference between the up going and downgoing wavefield floating datum and the NMO/DMO stacking velocities for the seismic data on an up going wavefield, floating datum the NMO/DMO stacking velocities for the seismic data on a down going wavefield floating datum can be determined. The NMO/DMO stacking velocities for the seismic data on the up going and downgoing wavefield floating datum is applied. In the final aligning step, post NMO statics are applied to bring each of the up going and the down going wavefields to the final datum. The up going and the down going wavefields are summed to provide dual wavefield reinforcement.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of dual wavefield reinforcement comprising:
   receiving seismic data having both up going and down going wavefields;
   separating said up going wavefields from said down going wavefields;
   aligning said up going wavefields and said down going wavefields including compensating for offset dependency;
   summing said aligned up going wavefields and said aligned down going wavefields.

2. The method according to claim 1 wherein said aligning includes:
   determining pre-NMO statics for each of said up going said down going wavefields;
   applying said determined pre-NMO statics to each of said up going and said down going wavefields.

3. The method according to claim 2 wherein said aligning includes:
   determining NMO/DMO stacking velocities for said seismic data on an up going wavefield floating datum.

4. The method according to claim 3 wherein said aligning also includes:
   determining a difference between the up going wavefield floating datum and the down going wavefield floating datum; and
   combining said NMO/DMO stacking velocities for said seismic data on an up going wavefield floating datum and said difference between the up going wavefield floating datum and the down going wavefield floating datum to determine NMO/DMO stacking velocities for said seismic data on a down going wavefield floating datum.

5. The method according to claim 4 wherein said aligning also includes:
   applying said NMO/DMO stacking velocities for said seismic data on said up going wavefield floating datum and said down going wavefield floating datum.

6. The method according to claim 5 wherein said aligning also includes:
   determining post NMO statics for each of said up going and said down going wavefields; and
   applying said determined post NMO static to bring each of said up going and said down going wavefields to the final datum.

7. The method according to claim 1 wherein said aligning includes:
   determining NMO/DMO stacking velocities for said seismic data on an up going wavefield floating datum.

8. Th method according to claim 7 wherein said aligning also includes:
   determining a difference between the up going wavefield floating datum and the down going wavefield floating datum; and
   combining said NMO/DMO stacking velocities for said seismic data on an up going wavefield floating datum and said difference between the up going wavefield floating datum and the down going wavefield floating datum to determine NMO/DMO stacking velocities for said seismic data on a down going wavefield floating datum.

9. The method according to claim 8 wherein said aligning also includes:

applying said NMO/DMO stacking velocities for said seismic data on said up going wavefield floating datum and said down going wavefield floating datum.

10. The method according to claim 9 wherein said aligning also includes:

determining post NMO statics for each of said up going and said down going wavefields; and applying said determined post NMO static to bring each of said up going and said down going wavefields to the final datum.

11. A method of dual wavefield reinforcement comprising:

receiving seismic data having both up going and down going wavefields;

separating said up going wavefields from said down going wavefields;

determining a pre-NMO and post NMO static for each of said up going and said down going wavefields;

applying said determined pre-NMO static to each of said up going and said down going wavefields;

determining NMO/DMO stacking velocities for said seismic data on an up going wavefield floating datum;

determining a difference between the up going wavefield floating datum and the down going wavefield floating datum;

combining said NMO/DMO stacking velocities for said seismic data on an up going wavefield floating datum and said difference between the up going wavefield floating datum and the down going wavefield floating datum to determine NMO/DMO stacking velocities for said seismic data on a down going wavefield floating datum;

applying said NMO/DMO stacking velocities for said seismic data on said up going wavefield floating datum and said down going wavefield floating datum;

applying said determined post NMO static to bring each of said up going and said down going wavefields to the final datum; and summing said up going and said down going wavefields.

12. A method of aligning upgoing and downgoing seismic energy data comprising:

determining pre-NMO statics for up going and down going wavefields representing upgoing and downgoing seismic energy;

applying said pre-NMO static to said up going and said down going wavefields;

determining NMO/DMO stacking velocities for an up going wavefield floating datum and a down going wavefield floating datum;

applying said NMO/DMO stacking velocities for said seismic data on said up going wavefield floating datum and said down going wavefield floating datum;

determining post NMO statics for said up going and said down going wavefield; and applying said determined post NMO statics to bring each of said up going and said down going wavefields to a final datum.

13. The method according to claim 12 wherein said determining NMO/DMO stacking velocities includes:

determining NMO/DMO stacking velocities for said up going wavefield floating datum;

determining a difference between said up going wavefield floating datum and said down going wavefield floating datum; and combining said NMO/DMO stacking velocities for the seismic energy data on said up going wavefield floating datum and said difference between said up going wavefield floating datum and said down going wavefield floating datum to determine NMO/DMO stacking velocities for said down going wavefield floating datum.

14. A system of dual wavefield reinforcement comprising:

receiving means for receiving seismic data having both up going and down going wavefields;

distinguishing means for separating said up going wavefields from said down going wavefields;

means for aligning said up going wavefields and said down going wavefields;

means for summing said aligned up going wavefields and said aligned down going wavefields.

15. The system according to claim 14 wherein said means for aligning includes:

means for determining pre-NMO statics for each of said up going and said down going wavefields;

application means for applying said determined pre-NMO statics to each of said up going and said down going wavefields.

16. The system according to claim 15 wherein said means for aligning also includes:

means for determining NMO/DMO stacking velocities for said seismic data on an up going wavefield floating datum.

17. The system according to claim 16 wherein said means for aligning also includes:

means for determining a difference between the up going wavefield floating datum and the down going wavefield floating datum; and addition means for combining said NMO/DMO stacking velocities for said seismic data on an up going wavefield floating datum and said difference between the up going wavefield floating datum and the down going wavefield floating datum to determine NMO/DMO stacking velocities for said seismic data on a down going wavefield floating datum.

18. The system according to claim 17 wherein said means for aligning also includes:

means for applying said NMO/DMO stacking velocities for said seismic data on said up going wavefield floating datum and said down going wavefield floating datum.

19. The system according to claim 18 wherein said means for aligning also includes:

means for determining post NMO statics for each of said up going and said down going wavefields; and means for applying said determined post NMO static to bring each of said up going and said down going wavefields to the final datum.

20. The system according to claim 14 wherein said means for aligning includes:

means for determining NMO/DMO stacking velocities for said seismic data on an up going wavefield floating datum.

21. The system according to claim 20 wherein said means for aligning also includes:

means for determining a difference between the up going wavefield floating datum and the down going wavefield floating datum; and means for combining said NMO/DMO stacking velocities for said seismic data on an up going wavefield floating datum and said difference between the up going wavefield floating datum and the down going wavefield floating datum to determine NMO/DMO stacking velocities for said seismic data on a down going wavefield floating datum.

22. The system according to claim 21 wherein said means for aligning also includes:

means for applying said NMO/DMO stacking velocities for said seismic data on said up going wavefield floating datum and said down going wavefield floating datum.

23. The system according to claim 22 wherein said means for aligning also includes:

means for determining post NMO statics for each of said up going and said down going wavefields; and means for applying said determined post NMO static to bring each of said up going and said down going wavefields to the final datum.

* * * * *

UNITED STATES PATENT AND TRADEMARK OFFICE
CERTIFICATE OF CORRECTION

PATENT NO : 6,151,275
DATED : Nov. 21, 2000
INVENTOR(S) : Joel Starr

It is certified that error appears in the above-identified patent and that said Letters Patent are hereby corrected as shown below:

Column 5, line 53, "At" should read -- $\Delta$t --.

Column 6, line 22, "pre-UMO" should read -- pre-NMO --.

Column 7, line 46, "u" should read -- U --.

Signed and Sealed this

Eighth Day of May, 2001

Attest:

NICHOLAS P. GODICI

*Attesting Officer*  *Acting Director of the United States Patent and Trademark Office*